United States Patent [19]

Holl et al.

[11] Patent Number: 4,999,781

[45] Date of Patent: Mar. 12, 1991

[54] CLOSED LOOP MASS AIRFLOW DETERMINATION VIA THROTTLE POSITION

[75] Inventors: William H. Holl, Flint; Wei-Ming Wang, Fenton, both of Mich.

[73] Assignee: General Motors Corporation, Detroit, Mich.

[21] Appl. No.: 380,435

[22] Filed: Jul. 17, 1989

[51] Int. Cl.⁵ .............................................. G06F 15/20
[52] U.S. Cl. ........................... 364/431.05; 364/571.01; 73/119 A; 123/489
[58] Field of Search ........................ 364/431.05, 431.06, 364/571.07, 571.01; 123/478, 480, 489; 73/119 A

[56] References Cited

U.S. PATENT DOCUMENTS

| | | | |
|---|---|---|---|
| 3,871,214 | 3/1975 | Masake et al. | 73/116 |
| 4,173,205 | 11/1979 | Toelle | 123/119 A |
| 4,446,523 | 5/1984 | Reinke | 364/431.65 |
| 4,625,698 | 12/1986 | Jamrog | 123/489 |
| 4,664,090 | 5/1987 | Kabasin | 123/494 |
| 4,750,352 | 6/1988 | Kolhoff | 73/117.3 |
| 4,873,655 | 10/1989 | Kondraske | 364/571.07 |
| 4,905,653 | 3/1990 | Manaka et al. | 123/489 |
| 4,928,654 | 5/1990 | Hosaka | 123/489 |

Primary Examiner—Parshotam S. Lall
Assistant Examiner—Tyrone Queen
Attorney, Agent, or Firm—Howard N. Conkey

[57] ABSTRACT

Mass air flow into an internal combustion engine is measured as a function of throttle opening. The mass air flow rate is expressed as an idle offset constant and the product of gain and effective air intake area which is a function of throttle position. During idle, the idle offset term is updated in response to an exhaust oxygen sensor feedback and during part throttle operation the gain is similarly updated to achieve stoichiometry. For subsonic air flow the mass air flow is further modified as a function of the ratio of manifold pressure to the pressure upstream of the throttle. At the same time the manifold dilution is controlled via an EGR valve to a predetermined schedule.

7 Claims, 3 Drawing Sheets

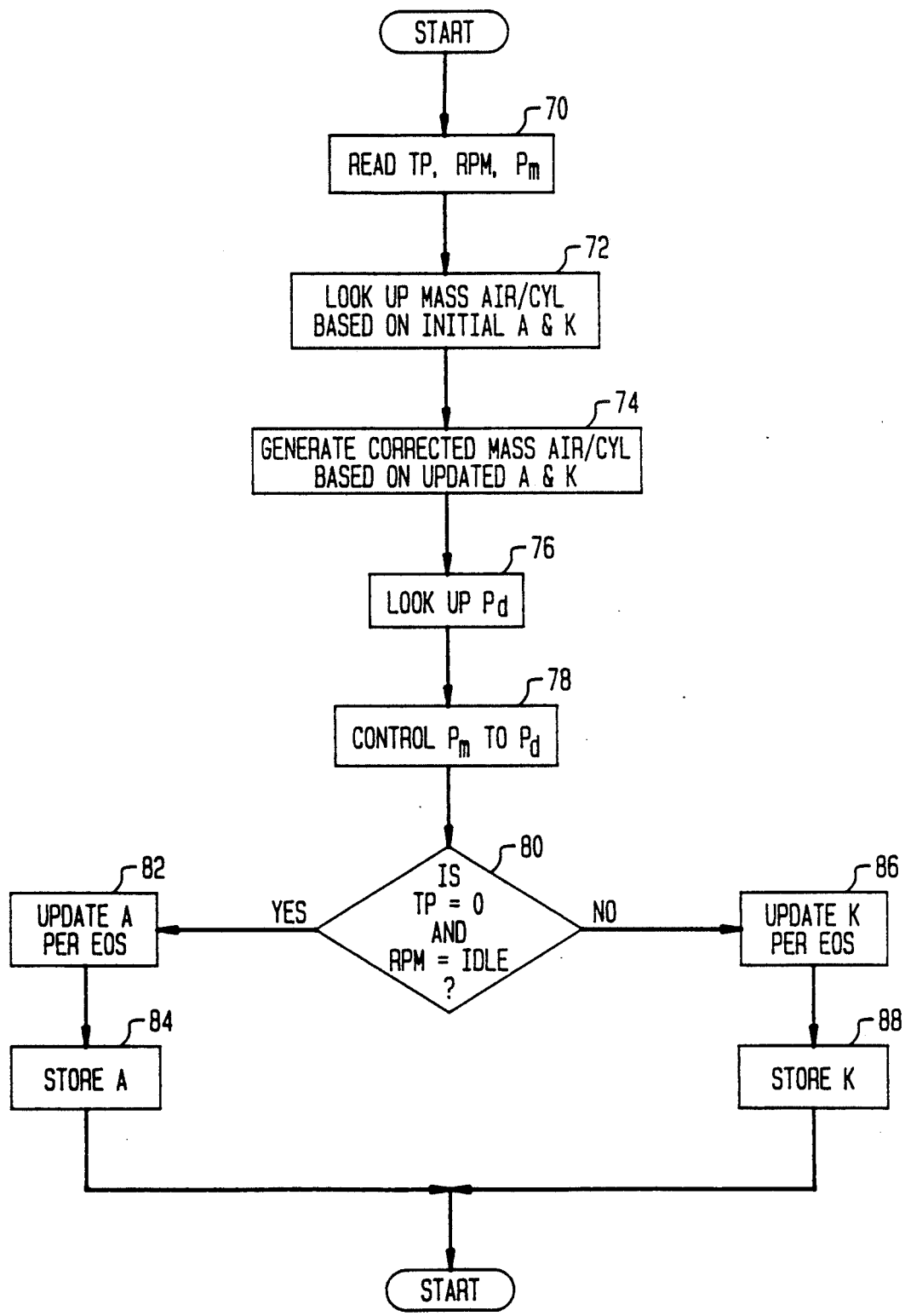

CLOSED LOOP MASS AIRFLOW DETERMINATION VIA THROTTLE POSITION

FIELD OF THE INVENTION

This invention relates to a method of obtaining mass air flow from throttle position in an air-fuel control system and particularly to such a method using exhaust oxygen sensor feedback.

BACKGROUND OF THE INVENTION

In automotive engine controls it is important to determine accurate values of mass air flow in each engine operating condition by a method insensitive to manufacturing tolerances, aging and ambient variation in order to meet the goal of obtaining good fuel economy, low exhaust emissions and good vehicle performance.

Many systems and methods have been proposed for measuring the mass rate of air flow into an internal combustion engine. Generally these systems require an air flow sensing element positioned in the air stream to sense air flow. For example, some prior systems provide for a vane that is moved by the air flow to an angular position which is a measure of air flow. Other systems employ a constant temperature anemometer positioned in the air stream. The latter is more commonly used and is more accurate for high air flow rates than for low rates. It is desired, however, to have accuracy over the whole range of engine operation. To this end it is proposed to either supplement or replace the anemometer with a system which is accurate at low mass air flow rates as well as at high rates.

It is already known to measure mass air flow without a special air meter. For example, U.S. Pat. No. 4,446,523 to Reinke discloses an open loop system in which the mass air flow into the engine is determined by the measured throttle angular position, the sensed pressure above the throttle and a stored schedule of values dependent upon the ratio of the pressure below the throttle to the pressure above the throttle. U.S. Pat. No. 3,871,214 to Masaki et al shows an open loop system for measuring air flow at sonic flows only, and is coupled to a supplementary air flow measuring device for subsonic flow measurement. The sonic air flow is computed from measured pressure above and below the throttle and the throttle position. U.S. Pat. No. 4,750,352 discloses a mass air flow meter for an engine equipped with a bypass around the throttle with an adjustable valve for varying the air at idle, wherein the mass air flow is determined from measured throttle position, variable valve position, barometric pressure, manifold pressure and manifold temperature.

SUMMARY OF THE INVENTION

It is therefore an object of the invention to provide a closed loop method of determining air flow as a function of measured throttle position, calculated desired manifold pressure and engine speed.

It is another object of the invention to provide a closed loop method of determining air flow as a function of measured throttle position, and measured pressures upstream and downstream of the throttle.

Still another object is to provide a direct, calibrated robust fuel command method as a function of measured throttle position, engine speed and exhaust oxygen sensor deviation from a preset value.

The invention is carried out by a method of determining mass air flow in an engine having a throttle position sensor for sensing the effective throttle opening and an exhaust oxygen sensor means for indicating deviations from stoichiometry when operating in a closed loop fuel control mode, comprising the steps of: calibrating initial values for closed throttle airflow offset and a gain factor for part throttle operation, operating the engine at closed throttle in closed loop fuel control mode with mass airflow determined on the basis of the airflow offset, and updating the offset in response to the oxygen sensor output for stoichiometric operation, and operating the engine at part throttle in closed loop fuel control mode with mass airflow determined on the basis of the airflow offset plus the gain factor multiplied by the effective throttle opening, and updating the gain factor in response to the oxygen sensor output for stoichiometric operation, whereby the offset and the gain are continually updated for accurate mass airflow determination over a wide range of operating conditions to obtain stoichiometric engine operation.

The invention is also carried out by a method of determining mass air flow per cylinder in an engine having a throttle position sensor for sensing the throttle opening TP, means for measuring engine speed (RPM), an exhaust oxygen sensor means for indicating deviations from stoichiometry when operating in a closed loop fuel control mode, and a manifold dilution control, comprising the steps of: calibrating initial values for closed throttle airflow offset (A) and a gain factor (K) for part throttle operation, generating a look-up table of mass air flow per cylinder (M) according to the equation $M = [A + K \, F(TP, Pm)]/RPM$ based on a predetermined value of manifold pressure for discrete ranges of M and RPM and on initial calibration values of A and K where A is an idle air offset value, K is a gain factor, and $F(TP, Pm)$ is a function of throttle opening and manifold pressure, looking up the value M in the table for current engine speed and throttle opening, updating A when $TP = 0$ to obtain stoichiometry during idle and updating K when $TP > 0$ to obtain stoichiometry at engine speeds above idle, revising the value of M in accordance with updated values of K and A to thereby determine the mass air flow per cylinder, and controlling the manifold dilution to obtain the manifold pressure related to the value M.

BRIEF DESCRIPTION OF THE DRAWINGS

The above and other advantages of the invention will become more apparent from the following description taken in conjunction with the accompanying drawings wherein like references refer to like parts and wherein:

FIG. 4 is a flow chart illustrating the operation of the system of FIG. 1 in determining the mass air flow in accord with another embodiment of the method of this invention.

DESCRIPTION OF THE INVENTION

The method of the invention was specifically developed to determine air flow and hence the fuel command necessary to operate the engine at stoichiometry. It will be apparent, however, that the same principles can be successfully applied to an engine operation at a set air/fuel ratio other than stoichiometry.

Figure 1:
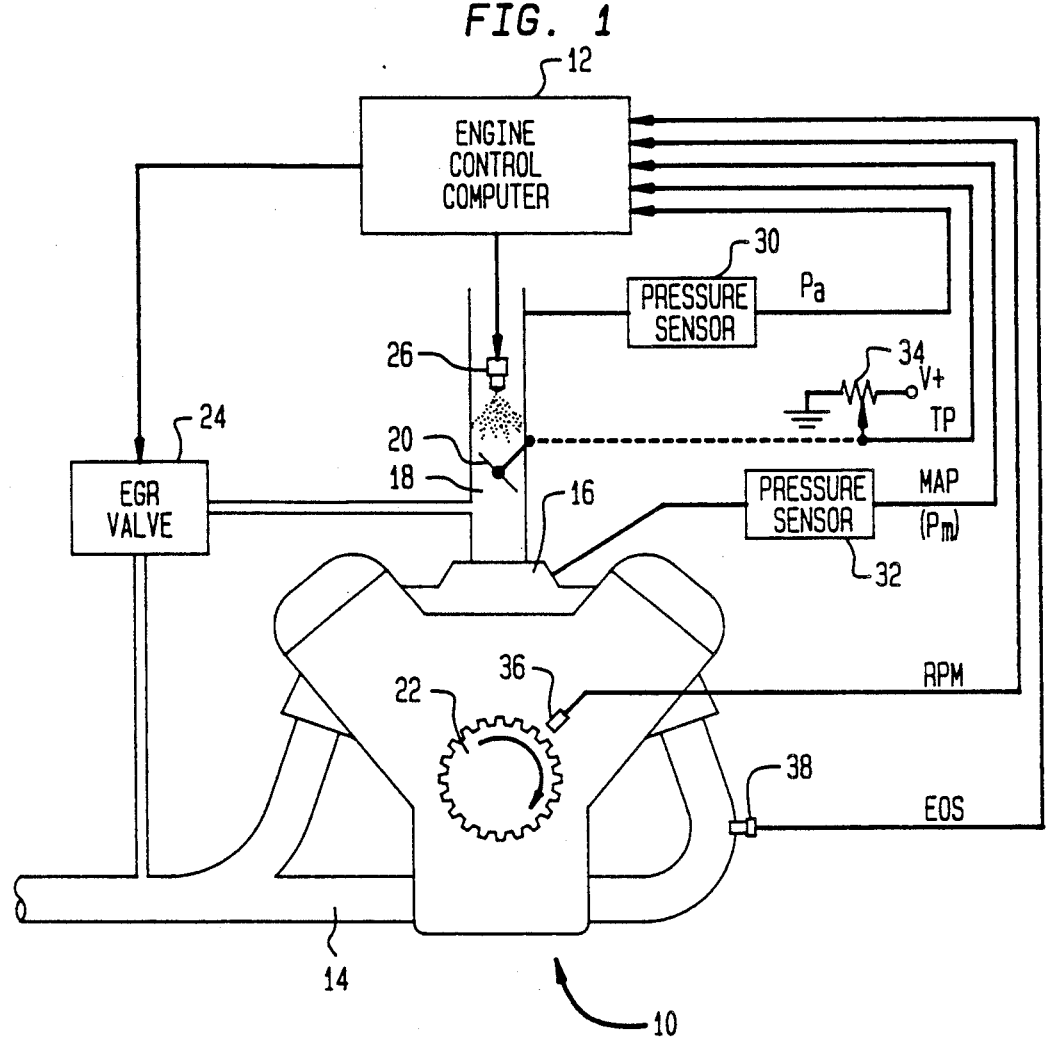
FIG. 1 is a schematic diagram of an engine and system for providing mass air flow measurements according to the invention.

Referring to FIG. 1, an internal combustion engine 10 controlled by a computer 12 has an exhaust manifold 14, an intake manifold 16, a throttle bore 18 containing a throttle 20 for passing air to the intake manifold, an engine starter ring gear 22, an exhaust gas recirculation (EGR) valve 24 for controllably feeding exhaust gas into the intake manifold, and fuel injection apparatus 26. The computer 12 controls the EGR valve 24 and the fuel injection apparatus 26. Input sensors coupled to the computer 12 include a pressure sensor 30 connected above the throttle 20 to measure the upstream pressure, Pa, a pressure sensor 32 connected to the intake manifold 16 to measure manifold absolute pressure (MAP) also known as Pm, a throttle position sensor 34 (TPS) in the form of a potentiometer to measure throttle opening (TP), an engine speed sensor 36 inductively coupled to the ring gear 22 to provide an RPM signal, and an exhaust oxygen sensor 38 (EOS) to provide the EOS signal indicative of air/fuel stoichiometry. It should be noted that the TPS signal is a voltage which is directly correlated to the effective air intake area or effective throttle opening and the effective area or opening can be directly calculated from the TPS signal.

As is well known in engine control art the mass air flow per cylinder event is measured or somehow calculated and the amount of fuel necessary to achieve stoichiometry is supplied to the engine. Because of delays or small errors in the system the exact value of the air/fuel ratio needed for stoichiometry is not usually achieved on the basis of air flow calculation alone. EOS measurement is used to determine the deviation from stoichiometry and the computer uses the information to tailor the fuel command issued to the fuel injector system 26 to achieve stoichiometry. In the computer, as shown in U.S. Pat. No. 4,625,698 to Jamrog, (which is incorporated herein by reference), two correction terms are generated to adjust the fuel command: a fast filtered term and a slow filtered term. Both these terms are at zero if the ideal air/fuel ratio is used. The fast term quickly makes a correction and often overshoots the mark in the case of a transient condition but soon settles down to an average value at steady state conditions. Then if the fast term is centered about a value other than zero, the slow term is adjusted to a compensating value which allows the average fast term to be returned to zero. According to this invention the slow term is incorporated into the mass air flow computation so that the correct value of air is determined.

It is also known in the engine control art to adjust the manifold pressure or dilute the intake manifold gases by adding exhaust gas to the intake manifold via the EGR valve. The advantage of this arrangement is to promote cooler combustion to lower certain emissions. The strategy used in this application, which is similar to that disclosed in U.S. Pat. No. 4,173,205 to Toelle, is to empirically establish the desired dilution, as evidenced by the manifold pressure, for several different ranges of engine speed and mass air flow per cylinder, store the values in a look-up table and to control the manifold pressure to the desired value by a closed loop EGR control responsive to a calculated mass air flow per cylinder and engine speed.

Classical air flow equations result in the relationship $$W = Pa\ S(TP)\ f(P)/(Ta)^{0.5};\qquad (Eq.\ 1)$$

where:
W is the mass air rate
Pa is the upstream pressure
S(TP) is the effective air intake area as a function of TP
TP is the % throttle opening
P is the pressure ratio Pm/Pa
f(P) is a function of pressure ratio Pm/Pa
Pa is the upstream pressure
Pm is the downstream pressure (MAP), and
Ta is upstream temperature. For sonic flow conditions (P<0.528) f(P) is unity, and for subsonic flow conditions f(P) approximates $2[P(1-P)]^{0.5}$.

It is important to note that the variables S(TP) and f(P) in Eq. 1 can change rapidly while all the others generally change very slowly. Pa is mainly dependent on barometric pressure and can change with altitude. Ta is a temperature which usually exhibits gradual changes. Thus one or more constants which are often updated can be substituted for all these slowly changing variables.

For sonic conditions where f(P)=1, the change of air flow with throttle opening is linear and the air flow can be expressed as $$W = A + K\ S(TP);\qquad (Eq.\ 2)$$

where A and K are constants. The term A represents the airflow at closed throttle idle conditions due to intentional bypass as well as leaks which may develop in the system. This term may change slowly and should be updated during closed throttle idle. The term K is the slope or gain and can also change slowly and is to be updated during part throttle operation. By reason of the calibration and update procedure to be explained, these terms incorporate all the relatively slowly changing variables in Eq. 1. Thus for operation during sonic conditions a simple function of throttle opening can express the mass air flow rate. For subsonic operation the factor f(P) is not unity and the air flow is expressed as $$W = [A + K\ S(TP)]2[P(1-P)]^{0.5}.\qquad (Eq.\ 3)$$

The mass air flow per cylinder event M is generally expressed as $$M = [A + K\ S(TP)]f(P)/RPM;\qquad (Eq.\ 4)$$

where f(P)=1; if P<0.528 and $f(P)=2[P(1-P)]^{0.5}$ if P>0.528.

Initial values of A and K are empirically determined for a particular model engine. Upon operation of the engine the values are updated to obtain stoichiometry as determined by the EOS 38. The slowly changing factor of the EOS closed loop is incorporated into A and K and these factors are continually updated during closed throttle and part throttle operation. Thus any initial manufacturing tolerance or slowly changing factor such as barometric pressure, temperature, leaks and other aging elements are included in the A and K updates. The updates are made only when the engine has warmed up enough for the EOS closed loop to be operative. The A term is updated at idle when TP=0 so that all deviations from stoichiometry are attributed to the offset. During part throttle operation the K term is updated and any further deviations form stoichiometry are attributed to the gain.

Figure 2:
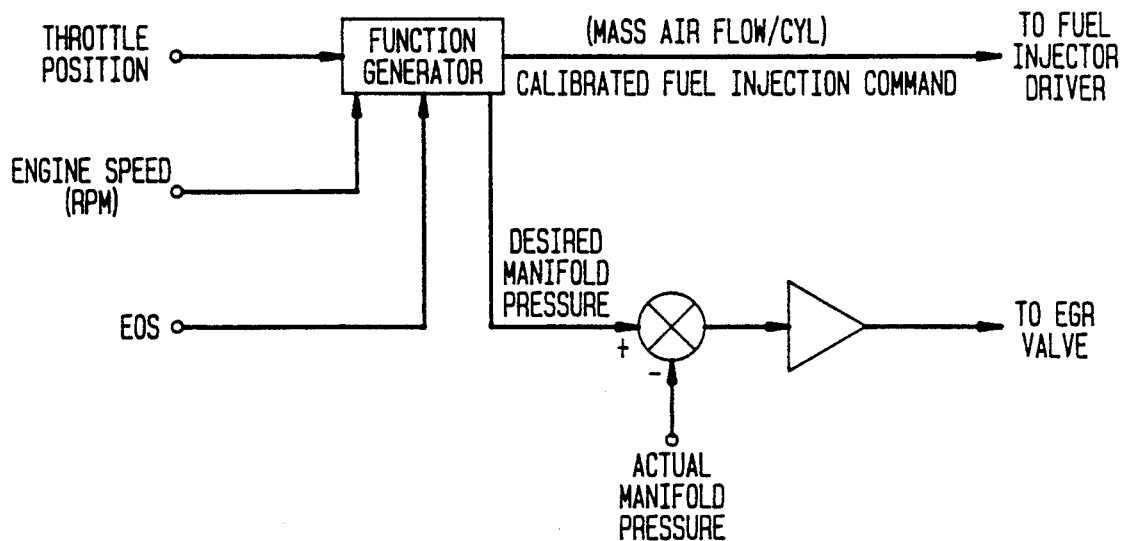
FIG. 2 is a functional diagram illustrating the overall scheme of mass air flow calculation.

The scheme of operation is illustrated in the diagram of FIG. 2. The throttle position, engine speed and EOS signal are combined in a function generator (computer 12) and the calibrated fuel injection command (which is directly proportional to the mass air flow per cylinder) is output to the fuel injection driver circuits. In addition desired manifold pressure is determined from a table and compared to actual manifold pressure and the difference or error is used to operate the EGR valve to control the manifold pressure to the desired pressure. Since the actual and desired manifold pressure are the same, or nearly so, the desired pressure can be used for the pressure ratio, P, calculation. This provides a direct leading fuel command that minimizes interactions between the fuel control and dilution control feedback loops; the fuel command is independent of the Pm measurement.

Figure 3:
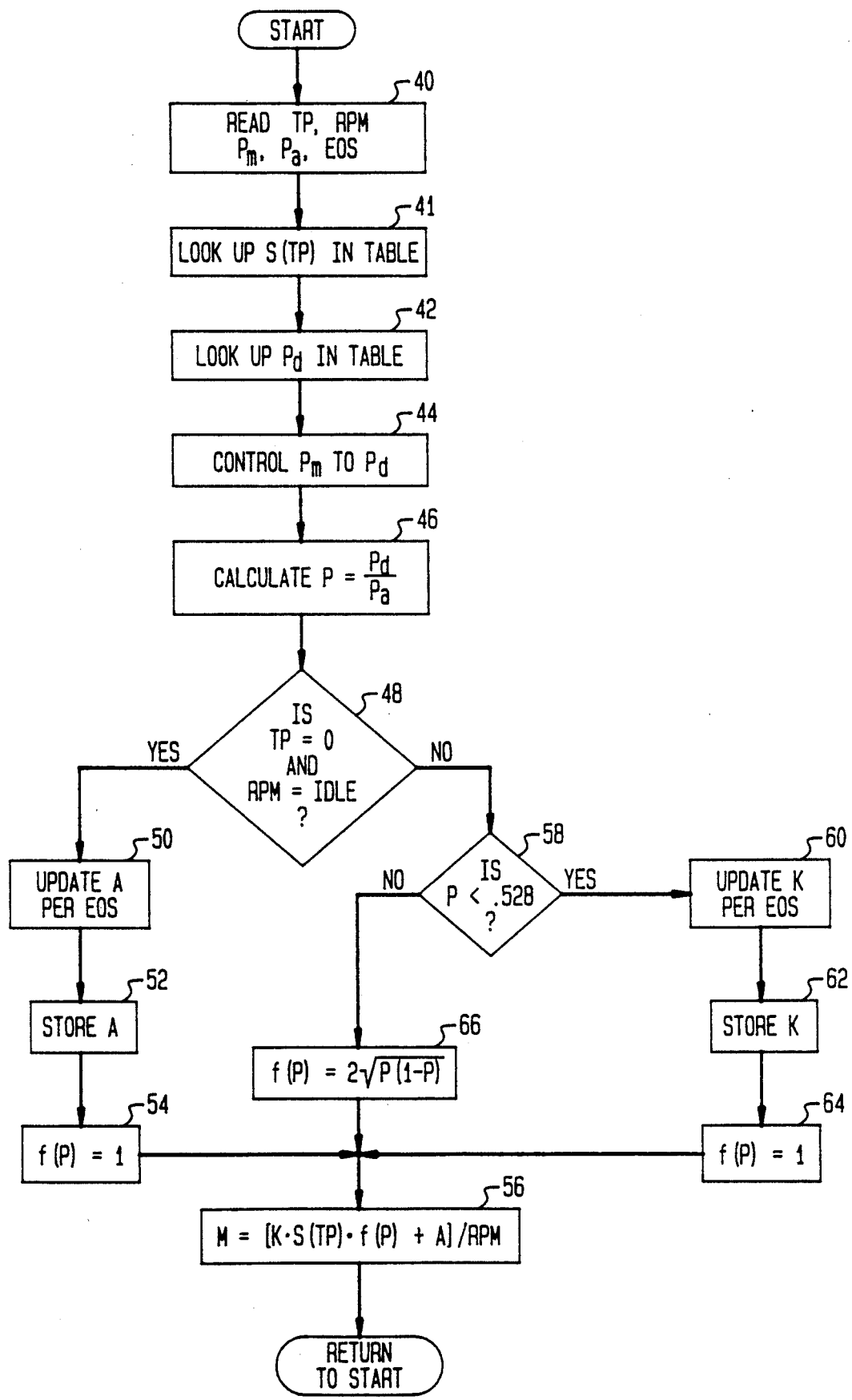
FIG. 3 is a flow chart illustrating the operation of the system of FIG. 1 in determining the mass air flow in accord with the method of this invention.

The operation is shown in more detail in FIG. 3. The described functions denoted with numerals in angle brackets <nn> refer to the numbered blocks in the flow chart. The program starts when the engine is in closed loop operation for stoichiometric operation under EOS control. The inputs TP, RPM, Pm, Pa, and the EOS signal are read <40>. The effective throttle area S(TP) is read from a table <41> or calculated. Then the desired manifold pressure Pd is found in a look-up table <42> and the actual manifold pressure Pm is controlled to Pd <44>, and the pressure ratio P is calculated from the ratio Pd/Pa <46>. (In an optional implementation, the dilution control as set forth is not used and P=Pm/Pa can be used for the ratio in block 46). If TP=0 and the engine speed is at idle <48>, the term A is updated in accordance with the slow correction term resulting from the EOS deviation <50> and stored <52>. The value f(P) is set equal to unity <54> and then the mass air per cylinder, M, is calculated <56>. If the engine is not at idle <48> and P<0.528 <58> indicating sonic flow, the K factor is updated in accordance with the slow correction term resulting from the EOS deviation <60> and it is stored <62>. Then f(P) is set equal to unity <64> and M is calculated <56>. If P>0.528 <58> no updating takes place but f(P) is set equal to $2[P(1-P)]^{0.5}$ <66> and then M is calculated <56>. Then the loop repeats.

A convenient implementation of the invention reduces the main mass air per cylinder calculation to a look-up table having RPM and TP as the independent variables and followed by an update operation. This results in an extremely fast determination of the value, M. The table is calculated a priori from a variation on Eq. 4 or $M=[A+K\ F(TP,Pm)]/RPM$, assuming standard sea level barometric pressure, initial values $A_0$ and $K_0$ for A and K, and values of Pd for the manifold pressure as derived for the dilution control. It will be seen that F(TP,Pm) is an expression of effective throttle opening adjusted for pressure effects and is a function of both the throttle opening and manifold pressure. Thus, the dilution control is necessary to this control scheme to conform the pressure Pm to the desired pressure Pd. A measurement of Pm for the look-up step is not needed but it is required for the dilution control. The upstream pressure Pa need not be measured since any variance from standard pressure occurs slowly and will be compensated for by adjustments to updated values of A and K.

FIG. 4 is a flow chart of the latter implementation which is used only under EOS closed loop control. First the values TP, RPM, and Pm are read <70>. Then M is read from the look-up table for the current TP and RPM <72>. Since the table is based on initial values of A and K, a corrected value of M is calculated based on updated values <74>. For example, if the initial value A0 is 128 and the updated value is 135, an amount equal to 7/RPM is added to M. Also, if the initial value K0 is 128 and the updated value is 150, a multiplier of 150/128 is used to adjust the value of M. Then dilution control is implemented by looking up Pd <76> and controlling Pm to Pd <78>. Then if TP=0 and RPM is at idle speed <80>, A is updated <82> and stored <84>. If the engine is not at idle conditions <80>, K is updated <86> and stored <88>. Then the loop repeats. In each version, the updated values are stored in a nonvolatile memory so that the most recent value is available when an engine is turned off and restarted or when power is removed from the engine control.

The embodiments of the invention in which an exclusive property or privilege is claimed are defined as follows:

1. A method of determining mass air flow in an engine having a throttle position sensor for sensing the effective throttle opening and an exhaust oxygen sensor means for indicating deviations from stoichiometry when operating in a closed loop fuel control mode, comprising the steps of:

calibrating initial values for closed throttle airflow offset and a gain factor for part throttle operation, operating the engine at closed throttle in closed loop fuel control mode with mass airflow determined on the basis of the airflow offset, and updating the offset in response to the oxygen sensor output to obtain stoichiometric operation, and operating the engine at part throttle in closed loop fuel control mode with mass airflow determined on the basis of the airflow offset plus the gain factor multiplied by the effective throttle opening, and updating the gain factor in response to the oxygen sensor output to obtain stoichiometric operation, whereby the offset and the gain are continually updated for accurate mass airflow determination over a wide range of operating conditions to obtain stoichiometric engine operation.

2. The invention as defined in claim 1 including the step of calculating the air amount per cylinder, M, for sonic airflow conditions as $M=[A+K\ S(TP)]/RPM$ where A is the updated closed throttle air offset, K is the updated gain factor, S(TP) is the effective air intake area as a function of throttle opening, and RPM is the engine speed.

3. The invention as defined in claim 1 including the step of calculating the air amount per cylinder, M, for subsonic airflow conditions as $M=[A+K\ S(TP)]2[P(1-P)]^{0.5}/RPM$ where A is the updated closed throttle air offset, K is the updated gain factor, S(TP) is the effective air intake area as a function of throttle opening, P is the ratio of pressures across the throttle, and RPM is the engine speed.

4. The invention as defined in claim 1 including the step of controlling the dilution of manifold gases by exhaust gas recirculation by empirically determining a look-up table of desired manifold absolute pressure with respect to engine speed and the air amount per cylinder, retrieving the desired pressure for current engine speed and air amount per cylinder, and controlling the manifold pressure to the desired pressure.

5. The invention as defined in claim 1 including the steps of:

calculating the air amount per cylinder, M, as $M = [A + K\ S(TP)]f(P)/RPM$, where A is the updated closed throttle air offset, K is the updated gain factor, S(TP) is the effective throttle opening, P is the ratio of the desired manifold pressure to the pressure upstream of the throttle, f(P) is unity for sonic conditions and is $2[P(1-P)]^{0.5}$ for subsonic conditions, and RPM is the engine speed, and controlling the dilution of manifold gases by exhaust gas recirculation by empirically determining a look-up table of desired manifold absolute pressure with respect to engine speed and air amount per cylinder, M, retrieving the desired pressure for current engine speed and air amount per cylinder, and controlling the manifold pressure to the desired pressure.

6. A method of determining mass air flow per cylinder in an engine having a throttle position sensor for sensing the throttle opening TP, means for measuring engine speed (RPM), an exhaust oxygen sensor means for indicating deviations from stoichiometry when operating in a closed loop fuel control mode, and a manifold dilution control, comprising the steps of:

calibrating initial values for closed throttle airflow offset (A) and a gain factor (K) for part throttle operation, generating a look-up table of mass air flow per cylinder (M) according to the equation $M = [A + K\ F(TP, Pm)]/RPM$ based on a predetermined value of manifold pressure for discrete ranges of M and RPM and on initial calibration values of A and K where A is an idle air offset value, K is a gain factor, and F(TP,Pm) is a function of throttle opening and manifold pressure, looking up the value M in the table for current engine speed and throttle opening, updating A when TP=0 to obtain stoichiometry during idle and updating K when TP>0 to obtain stoichiometry at engine speeds above idle, revising the value of M in accordance with updated values of K and A to thereby determine the mass air flow per cylinder, and controlling the manifold dilution to obtain the manifold pressure related to the value M.

7. The invention as defined in claim 6 wherein the updating step comprises updating A when TP=0 during idle in response to deviations from stoichiometry from the exhaust oxygen sensor to obtain stoichiometry, and updating K when TP>0 in response to deviations from stoichiometry from the exhaust oxygen sensor to obtain stoichiometry at engine speeds during part throttle operation.

* * * * *